United States Patent [19]

MacGinitie et al.

[11] Patent Number: 4,688,212

[45] Date of Patent: Aug. 18, 1987

[54] CENTRALIZED IMAGE RESPONSIVE TELEPHONE TIME SLOT INTERCHANGE SYSTEM

[75] Inventors: Gordon MacGinitie, Novato; Thomas R. Eames, Petaluma, both of Calif.

[73] Assignee: Harris Corporation, Melbourne, Fla.

[21] Appl. No.: 696,829

[22] Filed: Jan. 31, 1985

[51] Int. Cl.⁴ .............................................. H04J 3/02
[52] U.S. Cl. ...................................... 370/85; 370/96; 370/58
[58] Field of Search ....................... 370/85, 89, 58, 90, 370/96; 340/825.5, 825.51

[56] References Cited

U.S. PATENT DOCUMENTS

| | | | |
|---|---|---|---|
| 3,723,973 | 3/1973 | Kennedy | 370/58 |
| 4,187,399 | 2/1980 | Maxfield et al. | 370/58 |
| 4,530,090 | 7/1985 | Priamo et al. | 370/58 |
| 4,564,937 | 1/1986 | Perry et al. | 370/58 |
| 4,595,921 | 6/1986 | Wang et al. | 370/90 |

Primary Examiner—Douglas W. Olms
Attorney, Agent, or Firm—Joel I. Rosenblatt

[57] ABSTRACT

A central processor scans a plurality of ports for the purpose of receiving data or signaling information from a peripheral acting as an information source or for transmitting information to a peripheral addressed to receive that information. The processor selectively stores that information as an image of selected conditions at each port peripheral. The transmission of information between peripherals is accomplished on a timed schedule from the centrally located processor which uses the stored image to monitor local conditions at each peripheral without the need to specifically address each peripheral. Additionally, peripherals are arranged in modules to permit simultaneous exchange of information between ports.

35 Claims, 4 Drawing Figures

CENTRALIZED IMAGE RESPONSIVE TELEPHONE TIME SLOT INTERCHANGE SYSTEM

FIELD OF THE INVENTION

This invention relates to time division multiplexed communication systems.

BACKGROUND OF THE INVENTION

Time division multiplexed (TDM) telephone systems typically have a Central Processing Unit (CPU) controlling the TDM connections between port peripherals. This is accomplished typically be directly addressing an addressed or receiving peripheral in response to a transmitting or Source peripheral and routing the TDM pulse code modulation (PCM) words between the connected peripherals. That type of connection is on a random addressing basis and with the timing controlled by the immediate needs of the peripherals.

The disadvantage of that arrangement is the distributed processing required to control the addressing and the decoding and the status within each peripheral unit. Additionally, such devices require a sequential addressing either involving more addressing machinery or faster addressing machinery.

SUMMARY OF THE INVENTION

In accordance with the principles of the invention, a plurality of ports, connected to various peripheral devices, are arranged for port to port communication through a Telephone Time Slot Interchange System (TTIS). The TTIS is able to connect ports in any combination. According to the principles of the invention, a reduction in the size of the TTIS switching network is achieved by a real time scanning schedule of modules, representing groups of ports, rather than depending on separately addressing each port on a request or need basis.

According to the principles of the invention, the ports are addressed through a time dependent scanning schedule, thereby avoiding the need for random addressing mechanisms, within the peripheral units. Instead, according to the inventive principles, information, such as data information and signaling information, is stored within a centralized store. The centralized store serves as an image of the peripherals, i.e. data and signaling information, produced at each port and the status or condition of each port. The time scheduled addressing assures that the store always contains the port's most current information, whether signaling information used for operations or data passed to a designated addressed port from a Source Port. The image is contained in a centrally located image RAM for use in the interconnection of all the TTIS Ports. The TTIS Ports have two functions with regard to data: (1) to serve as a transmitter or as a source of that data (Source Port) and (2) to be the receiver of that data or the address location of that data (Address Port). In the preferred embodiment, Source and Address Ports are grouped and designated as separate Aource and Address Modules. Each of the separate groups of Address Ports within each Address Module have concurrent access to all of the Source Ports during a scanning cycle. This is accomplished, according to the preferred embodiment, by providing a Source Store for a complete set of Source Modules, with the capability of storing all the data acquired during one scan frame for each of the designated Address Modules. In accordance with Address Port modularity, as stated above, the Source Port groups are separated into respective Source Modules and a complete set of Source Store Modules, representing all Source Modules, are provided for access by any Address Module. The connection of the Source Ports through the Source Stores to the Address Ports is done responsive to a real time scanning schedule rather than by random addressing. As such, the real time scanning results in an Image Store represented in part by the aforesaid Source Store and in part by a store representing the signaling information, as will be explained below.

The number of Source Store locations for each module of Address Ports is equal to the total number of ports, or in the preferred embodiment, 2,048. The connective capability for each module of Address Ports is made redundant by providing a complete Source Store representing all Source Ports, for each module of Address Ports. For example, in the preferred embodiment, for 2,048 peripheral devices representing 4 Source Modules of 512 ports each, a Source Store of 4 Store Modules, serving 512 ports each, or a total of 2,047 ports, is provided for each Address Module of 512 Address Ports. The Source modularity in the preferred embodiment then, is arranged to provide 4 Store Modules representing a Source Store for all Source Ports in the system, to each Address Module, representing 512 Address Ports each. Access of each Source Store data for any Address Port within each Address Module is accomplished by a pointer value in the Address Store which is indicative of a location within that Address Module's Source Store, containing that data. In this way, data from a specified Source Port may be connected to a particular Address Port associated with that Address Store pointer location. This is accomplished by dedicating pointer locations in the Address Store to respective Address Ports. In the preferred embodiment, as the degree of modularity divides the total number of 2,048 ports into groups of 512 ports each, each of the Source Stores for each respective Address Store, contains the identical message from any one Source Port. However, only an Address Store pointer value location, having a pointer value set to access the Source Store location containing that message, can access that message and connect the data within that Source Store location to the dedicated Address Port for the respective pointer value location and Address Store.

As described above, the Address Stores are arranged with respect to Address Modules. In the preferred embodiment, the modules are in groups of 512 ports each. Within the real time scanning sequence, each of these separate modules, representing separate Address Ports, access the stores containing data for all of the 2,048 Source Ports. Further, the Source Ports are divided into Source Modules and a Store Module for each Source Module is provided for access, separately by each separate Address Module. In this way, in the preferred embodiment, the same Address Port is capable of receiving a data message from any Source Port within any of the four separate modules and within one real time scanning frame. Finally, the separate Address Modules may be made concurrently responsive to the scanning schedule so all data may be concurrently tranferred to the separate Address Modules, reducing scanning time.

TTIS ORGANIZATION

In the preferred embodiment, the TTIS system is organized into three components: the Call Processor System (CPU); the Telephone Controller System (TCU); and the ports, connected to peripherals. All line/trunk telephony and data units are connected to the TCU by a telephony bus which also provides multiplexing of modular groups of telephony devices, as will be explained below.

The Call Processing System (CPU) consists of the service unit providing clocks and a priority resolver, a state register and interrupts for the active and stand-by states and switchover control (not shown) to a redundant system in case of failure. In this connection, in the preferred embodiment, a redundant TTIS is provided which performs in parallel with the active TTIS except for the active TTIS function of connecting the Source and the Address Ports. In case of failure, the redundant TTIS is made active, so no loss of communication occurs. Additionally provided is the interface to the TCU. The CPU provides the control instructions for the TCU. The TTU provides timing to the TCU resulting in repetitive scans in real time and causing the conveyance of a message from a Source Port, the storage of that message at a first time slot, and then the exchange of that message with an Address Port at a second different time slot, with respect to the afaresaid first time slot.

The Telephony Controller System (TCU), including the Time Switch Unit (TSU) and the Scanner Signal Unit (SSU), mediates all communications between the CPU and the ports, scans the ports for service requests, provides the switch voice/data connections between ports, provides tone generator and conference functions and provides timing for the pulse code modulation of the telephony signals and the data. In the preferred embodiment, the TCU appears to the CPU as an image memory of 32 K bytes of RAM, divided into 2,048 blocks of 16 bytes each, with one block for each port. All of the functions associated with any one of the 2,048 ports appear in the 16 byte block as an image of each respective port and in a location assigned to that particular port. The 16 byte block is described below as the Port Interface Structure.

The telephony Bus is a composite of buses forming a multiplexing tree and in the preferred embodiment affects a maximum of 32 ports for each multiplexing level. It being understood, however, that the multiplexing modularity can be changed without affecting the inventive principles herein. This modularity is further reduced by multiplexing each unique pair of ports representing 32 separate scan intervals on to a single bus. The multiplexing stages in the preferred embodiment are a first level multiplexing 32 ports each into a single multiplex channel. There are then 16 of those single multiplex channels. Each of those 16 multiplexed channels are separated into two groups of 8 each. These two groups of 8 multiplex channels each, totalling 256 ports, are then processed through a serial to parallel converter, which changes or transforms bytes in serial form, with each consecutive byte being serially presented, into parallel bytes with consecutive bytes presented in serial form. Each converter, in a separate timeslot, with respect to a scanning frame, provides a parallel byte for a separate respective port. In the final multiplex level, the output of each converter, representing 256 ports, is then combined into one time divided multiplex channel representing the separate time slots for respective ones of the 512 ports within a Source Module.

As explained below, each of the ports provides data at a 64 K bit rate and signaling information at a 64 K bit rate. In multiplexing for the signaling information is the same as for the data and in the preferred embodiment, within one Source Module, the signaling information is combined from each of the two groups of 256 ports to provide one time divided multiplex output of signaling information for a Source Module of 512 ports and one time divided multiplex output for the data information with respect to that same module of 512 ports.

PERIPHERAL MULTIPLEXING

In accordance with the principles of the invention, the time slots are arranged according to the scanning schedule, rather than being assigned to ports as identified by conversations. The data and signaling information is not sent or received upon random demand of the CPU, but is continuously received, accessed and processed according to a real time scanning schedule, which in the preferred embodiment, comprises two milliseconds. The data at the 64 Kb rate and the signaling information of the 64 Kb rate from all Source Ports are multiplexed into the TCU, in a fixed multiplexing tree, as described above, and the information flowing out of the TCU to the Addressed Ports is demultiplexed in a symmetrical manner. The converter performs serial byte to parallel byte conversion in the multiplexing tree and in a symmetrical manner, in the demultiplexing tree. The 16 byte status and control registers with the TCU are dedicated to each port, are not located at the ports, but in accordance with the principles of the invention, are images maintained at a centralized location represented by RAM at the TCU. The data and control information for each port is maintained in the TCU in separate stores and represents an image of each port within each scanning cycle. That image is represented by the information in the TCU and refreshed each real time scan cycle. All ports are scanned within each cycle and the programmed functions performed during the cycle by the Signal Scanning Unit (SSU) is performed once for every port. The signal information provided by the port peripherals includes one byte of device identification, a one bit "service request" indicator monitored by the event scanner within the SSU and seven bits of additional status as further explained below. Two bytes that are sent to the ports are divided into a "busy/free" indicator bit, an outpulsing or ringing bit (as applicable) and fourteen bits of other control. Each port supplies type identification and any other functions as needed by the particular service.

According to the principles of the invention, the status byte last received on the last scan cycle, from each respective port is continuously monitored by an event scanner within the TCU. This bit is arranged to change when any significant condition changes at the port, the meaning of this bit varies from device to device and with the state of the event scanner. For simple units, it is the only status bit used and will mean "off-hook". The scanner, responsive to change of status bit, relays the port number to the CPU which holds the port number in a first-in, first-out (FIFO) register. A logic state machine which is multiplexed to the respective scan registers in respective ports is responsive to a 16 bit pattern written into the scan register by the CPU, for each respective port, to initialize and enable the state register to perform a particular desired function for each port. The state machine is controlled by the code pattern written into the scan register for each respective port, and directs the state machine to recognize a change in the status bit.

In the preferred embodiment, the scan register has three different modes: (1) an edge detector providing an adjustable debounce filter, that when enabled, reports the occurrence in the change of a peripheral devices status; (2) a dial pulse collector; and (3) a hook discriminator. A full set of signaling registers is provided for every port, including those assigned to tone and conference functions.

As stated above, rather than forming connections between a Source Port and an Address Port on an as-required basis, the status of each of the ports are monitored continuously over repetitive, consecutive scan-frames. All necessary information to conduct the time multiplexed connection between any pair or group of ports is performed within the TCU through the aforesaid image RAM within the TCU and within the SSU. It should be understood that the term "Source" Ports and "Address" Ports are used in the explanation of the invention and are equally applicable to each of the 2,048 ports in the preferred embodiment. The word "Source" Port is used to designate any one of the 2,048 peripherals when it is performing a function of transmitting information. The word "Address" Port is used to designate any one of the 2,048 ports at the time it is receiving information as the Addressee of the respective Source Port.

According to the centralized scheme of the invention, an attenuation control is provided for the data path at a single location within the Source Pointer Register for each port, as explained below. Attenuation is selected from a set of 16 independent attenuation codes, responsive to the Source Pointer Register, established, as stated above, for each port. The attenuation is implemented by a table of output characters, as a function of input characters contained in a bipolar PROM. In this way, a central location is provided for attenuation of each of the peripheral devices attached to respective ports.

In accordance with the principles of the operation, the 2,048 port switch is implemented within a set of 4 Image Store Modules, operating in parallel, each serving 512 ports. In this way, full service can be provided to each port from a central location and modularity affords concurrent scanning of Address Store Modules and a reduction in processing time. Each Source Store is 32 bits wide so that four samples of 8 bits each may be written into it at once and one sample from each of the 2,048 possible sources can be written in 512 cycles. The Source Store is organized with a redundancy related to the number modularity chosen. Although the modular redundancy adds to the cost of the unit, that cost is offset by the simplicity, direct centralized control and the advantage of modularity offered by this organization.

Tone patterns are generated through 64 independent PCM sequences, each with its own peripheral number. Any number of telephony peripherals can be connected to any tone by writing the tones peripheral number to the addressed peripheral. Each tone is produced by reading a selected sequence of PCM samples from an EPROM and then selecting its sequence indefinitely. Each tone has a starting address pointer that is set by software to select one of the sequences in the PROM. The starting pointers may also be changed and it is possible to generate tone patterns at the tone ports by changing the starting pointer values in an appropriately timed sequence. The Call Action Processing subsystem within the CPU (CAP) interprets and records actions by callers and tracks parties on hold. It collects and interprets signaling information, including "key" depressions and hook flashes and determines what to do when action has not been taken within a predetermined time.

DESCRIPTION OF THE PREFERRED EMBODIMENT

Figure 1:
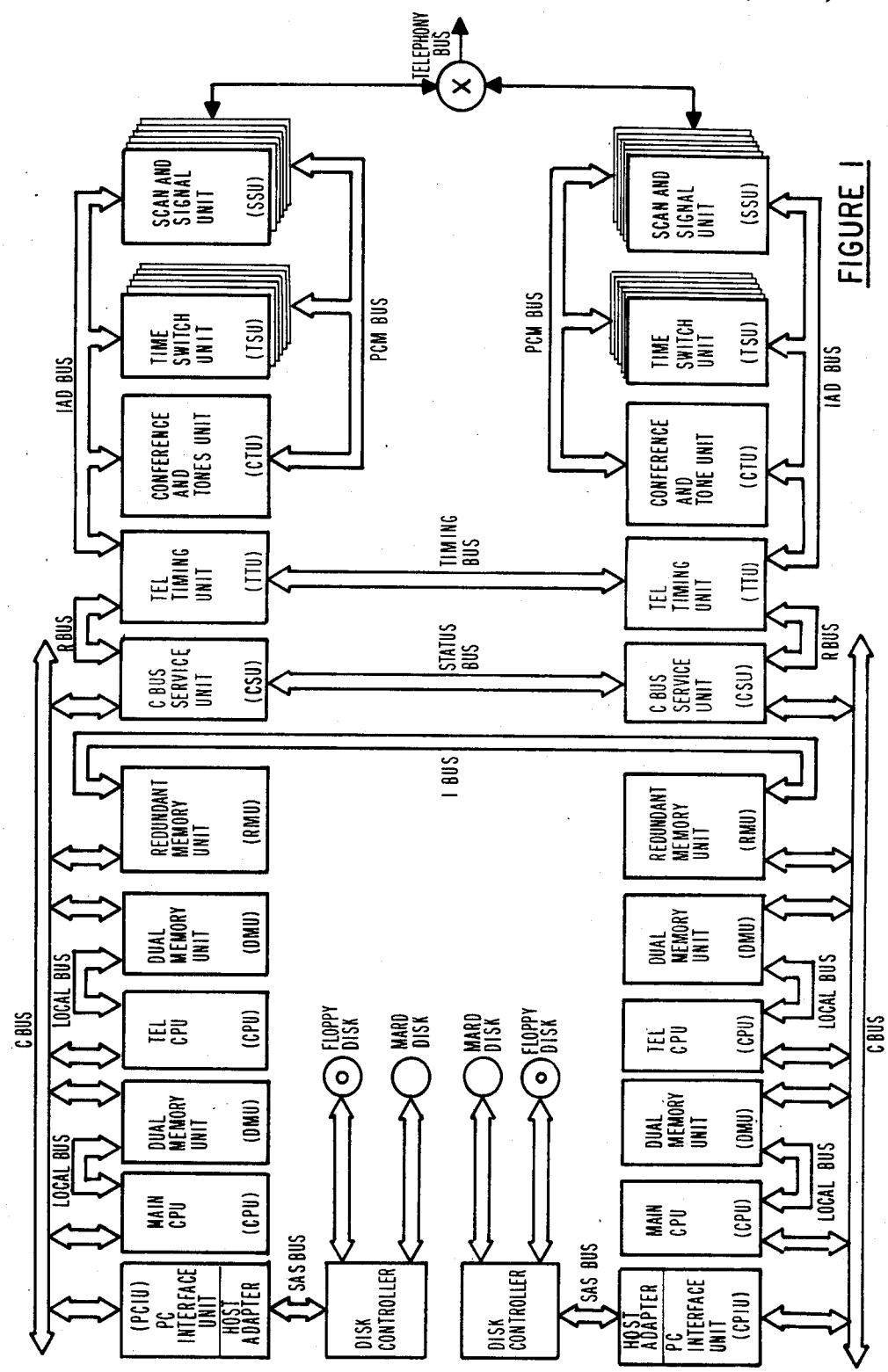
FIG. 1 shows in block form the TTIS including the telephone controller which includes the Telephone Timing Unit (TTU), Conference and Tone Unit (CTU), Time Switch Units (TSU), and Scan and Signal Unit (SSU), and the Call Processing Unit (CPU) providing control functions over the TCU.

The principles of the invention are best explained with reference to the preferred embodiment shown and described herein. FIG. 1 shows in block diagram the TTIS and in particular, the CPU and the TCU. The ports are connected to the TCU through the Telephony Bus. The Telephony Bus provides several levels of multiplexing of the time divided multiplexed outputs of each of the ports connected to the Telephony Bus, as further described below.

The TTIS central switch function, causing the connection of Source Port to Address Port, occurs within the Telephony controller and in particular within the Time Switch Unit (TSU) of the Telephony Controller. The TSU provides non-blocking access for up to 2,048 peripherals, in the preferred embodiment. However, it should be understood that modular nature of the TSU permits the expansion of the maximum number of peripherals without any change to the inventive principles. As shown in FIG. 1, the TTIS comprises the Telephone Timing Unit (TTU), the Conference and Tones Unit (CTU), the Time Switch Unit (TSU) and the scanning and Signal Unit (SSU). The Telephony Bus as explained below provides a multiplexed input from the peripherals to the Telephony Controller and a demultiplexed output from the Telephony Controller back to the peripherals. In the preferred embodiment, complete redundancy is provided (not shown) in case of failure of any part of the system.

Figure 3:
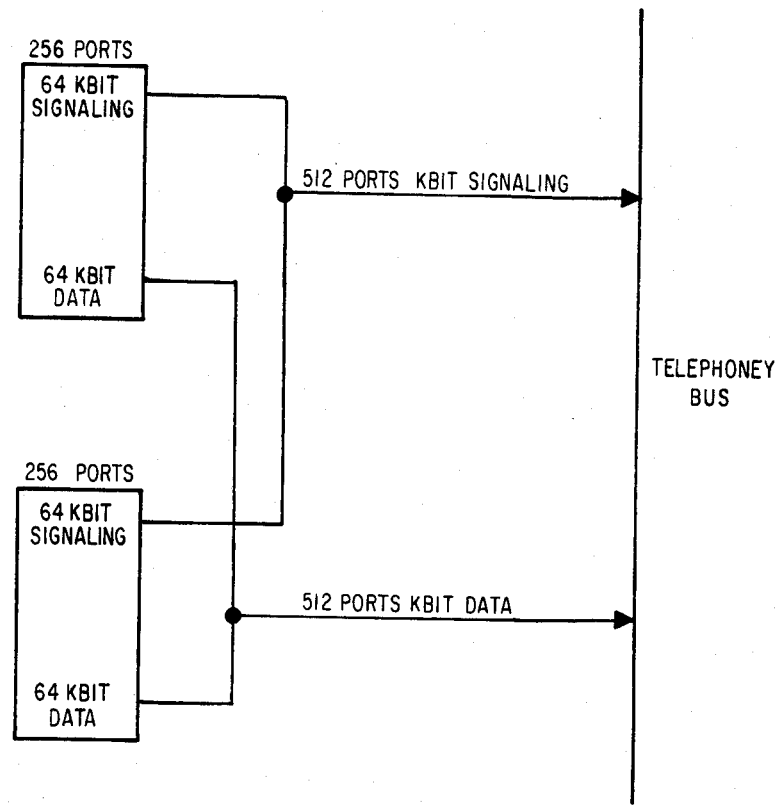
FIG. 3 shows the manner in which the data lines at 64 kilobits and signaling lines at 64 kilobits are separated from their respective signaling or data pairs respectively and combined with like data and signaling pairs.

The above stated multiplexing is accomplished by a multiplexing tree producing a Time Divided Multiplexed (TDM) output of consecutive bytes for each Source Port Module. In the preferred embodiment, are 4 modules which comprise 512 ports each. Within a module of 512 ports, multiplexing is simultaneously arranged to produce 16 groups of 32 ports. Within each group of 32 ports, each port has a fixed time assignment. The 16 groups of 32 ports are multiplexed to produce 16 output channels, each channel providing in serial form the time division multiplexed output for respective 32 ports. These 16 output channels are then multiplexed into two groups of 8 channels each, which are then processed through a serial to parallel converter to produce 8 consecutive parallel bytes of data from the serial data and producing, on the output of each converter, consecutive bytes from 256 ports. These 256 bytes of information are then combined as shown in FIG. 3 to produce a single multiplexed output of 512 consecutive bytes of information. The demultiplexing out of the TTIS is accomplished in a symmetrical manner. In the preferred embodiment, the multiplexing and demultiplexing substantially occurs on the Telephony Bus.

The elements of the TTIS are redundant to reduce the possibility of a single failure causing inoperation of the entire system. The TTIS is designed as two independent control halves, each half of which is capable of controlling system. Only one-half of the TTIS is active at any given time; the other half may perform all functions except the transmission of data and signaling information to the ports. In this way, the redundant half is always ready to assume active control of the system at any time.

Any common control subsystem failure in the elements of the TTIS will cause a transfer of control from the active to the inactive control half. During the transfer of control, all interconnections already in a stable state are retained in that state.

The redundant half of the TTIS is connected by three cross-coupled data busses, an IBUS, a STATUS BUS, and TIMING BUS. The IBUS provides a path by which pertinent data may be passed. The STATUS BUS provides a means of switchover control and current information pertaining to the functional state of either redundant half of the system and the TIMING BUS provides synchronization control between the redundant halves so that in the case of switchover timing of other critical functions would be maintained.

Figure 2:
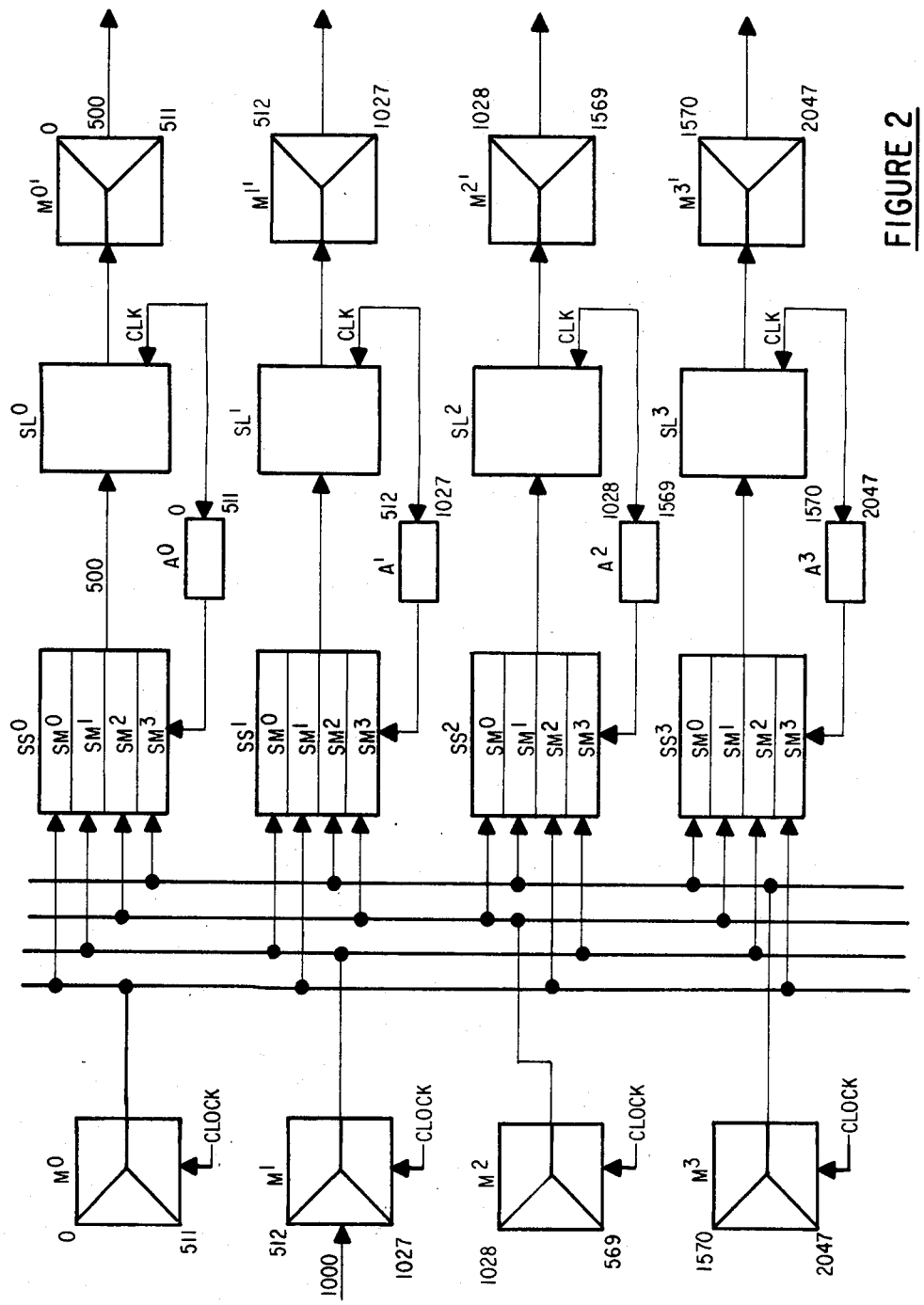
FIG. 2 shows in block and schematic form, the division of the ports into Source and Address Modules and the redundant Source Store arrangement for each Address Module, according to the principles of the invention.

A schematic representation of the data connection paths in the TTIS and in particular within the TCU is shown in FIG. 2. As shown therein, Module Multiplexers shown as $M^0$ through $M^3$ concentrate each of 512 data and signal pairs in each Source Module into a parallel output of 8 bits, represented by the respective single channels of each multiplexer. For each of the Module multiplexers, timing is controlled by the TTU through "CLK".

As shown in FIG. 2, the X-Bus directs the data from any Source Module ($M^0$, for example) to its respective Source Store Module within each of the Source Stores ($SS^0$). As shown, for example, through the X-Bus, the data from a source 511, Source Module $M^0$, would be stored in Store Module $SM^0$ in Source Store $SS^0$, Store Module $SM^1$ in Source Store $SS^1$, Store Module $SM^2$ in Source Store $SS^2$, Store Module $SM^3$, in Source Store $SS^3$. The use of the X-Bus eliminates a multiplexer and reduces the complexity of the unit.

The output of the Source Stores ($SS^0$–$SS^3$) is provided to a selector for respective Source Stores. For example, selector $SL^0$ is provided for Source Store $SS^0$, selector $SL^1$ is provided for Source Store $SS^1$, and so on. The selector serves to couple the information contained within a Source Store location, selected by a pointer value within an Address Store pointer location, to an Address Module dedicated to that pointer location. Each of the demultiplexers $M^{0'}$, $M^{1'}$, $M^{2'}$, $M^{3'}$, then distribute the data to the respective ports through the Telephony Bus. For example, where data from a peripheral connected to port 1000 is to be provided to Address Port 500, then according to the timing of the scanning schedule, the address of the data for port 1000, would be selected from the pointer value location in Address Store $A^0$, dedicated to the Address Port 500. That data, accessed from Source Store $SS^0$, Store Module $SM^1$, according to the aforesaid pointer value location within $SL^0$ Address Store $A^0$ for Address Port 500, would then be selected by selector $S^0$ accordingly, to that scanning schedule and provided to the selector output, and to its respective demultiplexer $M^0$, and to that respective Address Port 500.

As stated above, the Address Modules ($A^0$, $A^1$, $A^2$, $A^3$) contain the pointer value store locations, dedicated to respective Address Ports within each Address Module. As shown for the preferred embodiment, each Address Module ($A^0$–$A^3$) Store may read a message transmitted from any of the 2,048 Source Ports for any one of the 512 Address Ports dedicated to that particular Address Store. For Address Store $A^0$ dedicated to peripherals 0 through 511, a pointer within the Address Store, in a location dedicated to an Address Port. For example, port 500 would contain the location of the message unit from Source Port 1,000, located within Source Store SS0, Store Module $SM^1$. Accessing that location through that pointer value under control of the system timing, would cause that message to be distributed through $SL^0$ and $MO^1$ to port 1. In each real time scanning cycle, each Store Module within each Source Store ($SS^0$, $SS^1$, $SS^2$, $SS^3$) has 512 one sample write cycles and 512 one sample read cycles corresponding to 512 pointer values within each Address Module associated with that respective Source Store (i.e. $A^0$ for $SS^0$, $A^1$ for $SS^1$, $A^2$ for $SS^2$ and $A^3$ for $SS^3$). The scanning through all Address Stores can be concurrent, as the provision of a complete Source Store for each Address Module enables each Address Store to access any one of the total system Source Ports.

According to the principles of the invention, addressing is structured such that each message unit from any one Source Port will be stored in a manner that is accessible to any Address Port in the system, including itself. As shown and described above, this is done on a modular basis by selecting modular groups of distinct and separate ports, and redundantly storing that data within redundant modular memory areas in redundant Source Stores. Additionally, the ports are further modularized by dedicating selected ports to respective address pointer value locations in each Address Store, with the result that any message can be routed to its designated Address Port by selecting the Address Store corresponding to that Address Port and storing a pointer value within that Address Store location for the respective Store Module starting the Source Port data for transmission to that Address Port.

Under the control of the CPU and with timing provided by the TTU, bytes of information are located in Store Modules ($SM^1$, $SM^2$, $SM^3$) in Source Store locations ($S^0$, $S^1$, $S^2$, $S^3$), for access by designated Address Ports through the Address Store pointer value stored in Address Modules ($A^0$, $A^1$, $A^2$, $A^3$). The placement of the data occurs for each port transmitting data within a scanning cycle. Access of the data for an Address Port takes place within one scan cycle. The transfer of the information through the TTIS occurs without any need for specific or random addressing and it accomplished by a time sequence scanning operation rather than the use of addressing techniques.

Each Address Store pointer contains two bits which locate the Store Module ($SM^0$, $SM^1$, $SM^2$, $SM^3$) within each Source Store ($SS^0$, $SS^1$, $SS^2$, $SS^3$), containing the information to be accessed from the Source Port. In the preferred embodiment, this is accomplished by means of an exclusive or gate but as will be known to those skilled in the art, can be accomplished by any other suitable method. A 9 bit address then accesses the correct location in the selected Source Store ($SM^0$-$SM^3$) within the respective Source Store ($SS^0$-$SS^3$) for that Address Store ($A^0$-$A^3$). Further, each of the Source Stores ($SS^0$, $SS^1$, $SS^2$, $SS^3$) can be addressed by its respective Address Store ($A^0$, $A^1$, $A^2$, $A^3$) with the four access operations occurring concurrently, thereby providing an unblocking operation during any one subcycle. Where the Address Ports are dedicated to separate Address Stores, four such Addressed Ports receiving information can simultaneously interrogate one or more Source Ports.

Figure 4:
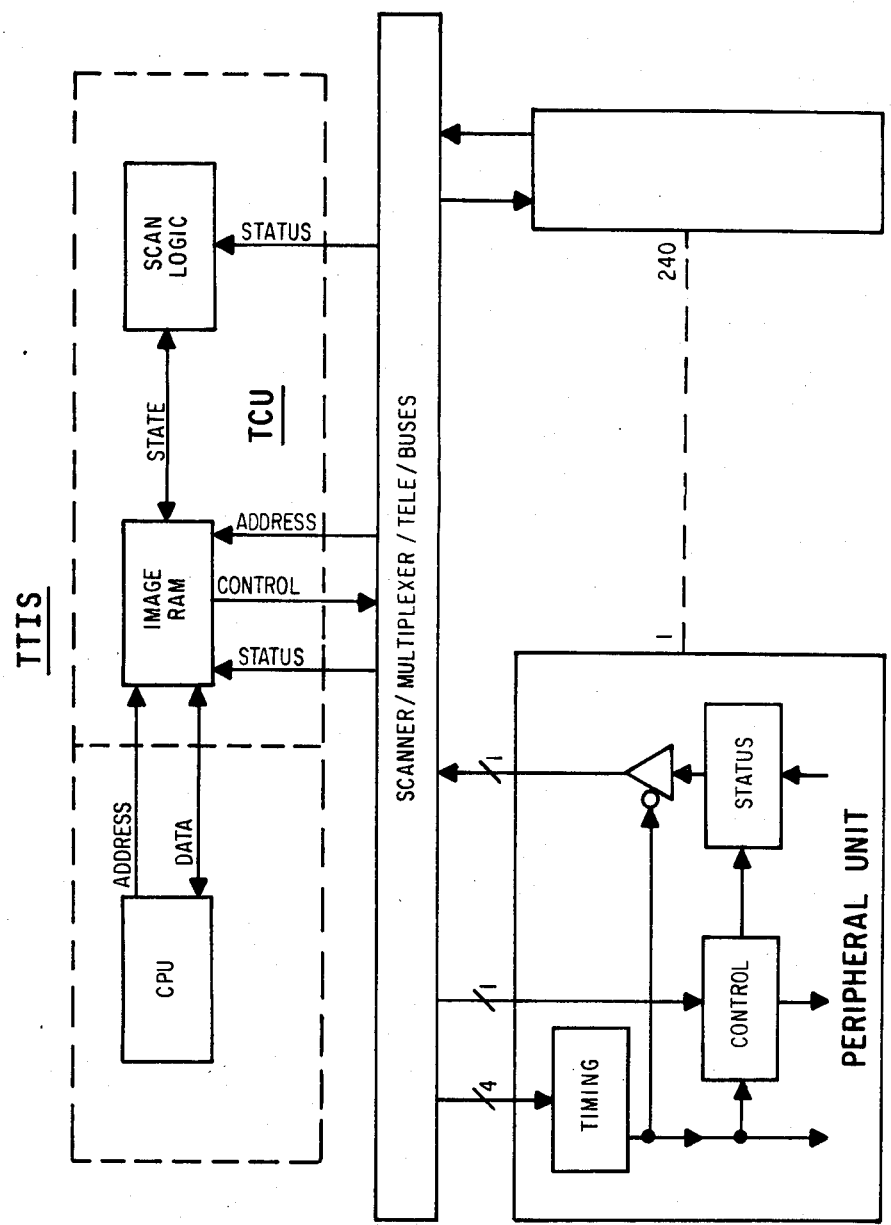
FIG. 4 shows in schematic form and representative form, an image RAM comprising the TCU Source and Port Memory Stores, responsive to scan logic, for storing an image of status and data information generated by the peripheral units.

In further explanation of the inventive principles, FIG. 4 shows a block representation, the connections, of the CPU and the TCU within the TTIS, through the Telephony Bus to the port connected peripheral units. As shown, the TTIS comprises the CPU with all CPU functions as shown in FIG. 1 and the TCU comprising all functions shown within FIG. 1. The image RAM shown within the TTIS is further explained below and includes the Source Stores $S^0$, $SS^1$, $SS^2$ and $SS^3$ as well as the memory structure array for each port shown below as the Port Interface Structure. As further shown, the Telephony System Map is comprised of Port Interface Structures for each of the ports. The Port Interface Structures store the status provided by the signaling information, the address pointer value location for the Source Store and an attenuation pad value in addition to other information, as explained below.

The image RAM, as shown in FIG. 4, is a representation of the Source Store ($SS^0$-$SS^3$), as shown below.

Further details of the Scan and Signal Unit (SSU) the Time Switch Unit (TSU), the Telephony Timing Unit (TTU) and the Conference and Tone Unit (CTU) is provided below.

TELEPHONY TIMING UNIT (TTU)

The Telephony Timing Unit (TTU) presents a microprocessor-type asynchronous interface (the RBUS) to the call processing computer system ("CPU") through which the CPU may read or write all the registers that control and/or monitor telephony functions; the Telephony Controller system is a peripheral for the CPU.

The TTU implements initialization controls for the telephony subsystem and a First In-First Out queue (FIFO) for event reports from signal scanners.

The TTU contains the master oscillator that clocks all telephony units and means for synchronizing this oscillator to an external reference or to a redundant controller; the Telephony Controller system provides timing for the PCM Codes and date devices and is itself a synchronous machine.

CPU INTERFACE

The TCU's registers are presented via the RBUS to the Common-Control Services Unit (CSU) (see FIG. 1) as a contiguous block of 16,384 words of 16 bits (32K bytes). The address of the Telephony Controller sent by the CPU is determined by logic in the CSU.

All the TCU's registers are either read-write or read-only; there are no write-only registers. The data read from any register that is not specified to be read-only, will be the data most recently written to it. Writing to the read-only registers is permitted but the data written will be discarded.

In the following descriptions: all addresses are given in hexadecimal notation (base 16, indicated by a $ prefix) and are relative to the block origin implemented by the CSU the bits in a word are number $F (15) for the most significant through 0 for the least; and the logic values are described from the point of view of the CPU, not the bus nor the internal logic.

PORT STRUCTURE ARRAY

The Telephony Controller register addressing was designed to correspond as far as possible to an array of structures indexed by Port Number, the various register functions for each port are arranged as a group of sixteen consecutive bytes, as shown below.

TABLE I

PORT INTERFACE STRUCTURE

| Bit: F E D C | B A 9 8 | 7 6 5 4 | 3 2 1 0 | |
|---|---|---|---|---|
| Byte $F | Conference, Tone Generator and Telephony System Control | | | Byte $E |
| $D | | | | $C |
| $B | (spare) | | | $A |
| $9 | PCM Source Address | | Pad | $8 |
| $7 | Scan Register | | | $6 |
| $5 | Extend | | Type | $4 |
| $3 | Control | | OUT | $2 |
| $1 | IN | | Status | $0 |

The registers for Port N are bytes $10*N+$00 thru $10*N+$ OF; for example, the registers for
Port 0 ($000) are $0000 thru $000F
Port 1 ($001) are $0010 thru $001F
Port 16 ($010) are $0100 thru $010F
Port 256 ($100) are $1000 thru $100F
Port 2047 ($7FF) are $7FF0 thru $7FFF

CONTROLLER UNIT ADDRESSING

The various bytes in the port structure register array are implemented by the several units of the TCU system; the correspondance of the various parts of the array to the units that implement the various parts of the array to the units that implement the respective functions is shown by the Telephony System Map shown below.

The least significant four bits of the RBUS address are shown decoded as "Byte" (of port structure) across the top of the chart; the most significant eleven bits of the RBUS address are shown decoded as "Port" (of 2048) along the sides; the card slot in the shelf for each unit is shown as "#nn".

TABLE II
TELEPHONY SYSTEM MAP

| Port | Byte: F E D C | B A 9 8 | 7 6 5 4 3 2 1 0 |
|---|---|---|---|
| 2047 — 1536 | TTU #11 | TSU-3 #19 | SSU-3 #20 |
| 1535 — 1024 | | TSU-2 #17 | SSU-2 #18 |
| 1023 — 512 | CTU #12 | TSU-1 #15 | SSU-1 #16 |
| 511 — 0 | | TSU-0 #13 | SSU-0 #14 |

SIGNAL SCANNER REGISTERS

Bytes #$0 thru 7 of the port structure are implemented by the Signal Scanner Units (SSU) and are described below.

TIME SWITCH REGISTERS

Bytes #$8 thru B of the port structure are implemented by the Time Switch Units (TSU) and are described below.

Each Time Switch or Signal Scanner Unit implements the registers and corresponding functions for only one module of 512 consecutive ports; one, two, three, or four pairs of these units may be installed.

CONFERENCE AND TONE REGISTERS

Bytes #$C thru F of the port structure for Ports 0 thru 1023 are implemented by the Conference and Tone Unit (CTU) and are described below.

These registers are used only by Ports 0 thru 127; bytes $C thru $F for ports 128 thru 1023 are spare.

The conference and tone registers do not form part of this invention and are not otherwise described.

TELEPHONY TIMING REGISTERS

Bytes #$C thru F of the port structure for Ports 1024 through 2047 are implemented by the Telephony Timing Unit (TTU); these 4096 bytes comprise:

3568 bytes of spare RAM
    Ports 1024=$400 thru 1791=$6FF
    and 1920=$780 thru 2043=$7FB
512 bytes of FIFO Queue Buffer
    Ports 1792=$700 thru 1919=$77F
16 bytes of System Control Registers
    Ports 2044=$7FC thru 2047=$7FF These registers are not functionally related to the ports; they have been placed arbitrarily within the port structure to avoid expanding the address space and further complicating the address decoders.

The FIFO's buffer is normally read-only; bytes #$C thru F for Ports 1792 thru 1919 cannot be used by Software except for hardware diagnostics in an off-line system. The operation of the FIFO is described below.

SYSTEM CONTROL REGISTERS

The TTIS system functions are controlled by four bytes and four words of registers that have been distributed over the last four bytes of each of the last four ports shown below.

TABLE III
TTIS SYSTEM CONTROL REGISTERS

| Port | Byte: $F | $E | $D | $C | Port |
|---|---|---|---|---|---|
| 2047 | INIT | CONFIG | SERIAL NUMBER | | $7FF |
| 2046 | Q-WPTR | Q-SIZE | FIFO DATA | | $7FE |
| 2045 | FREQUENCY | | CYCLE MONITOR | | $7FD |
| 2044 | * Not Implemented * | | | | $7FC |

Note that all these registers will be implemented and at these addresses even when there are fewer than 2048 ports in the system.

The four bytes for port 2044 ($7FCC–$7FCF) are reserved for future use; in this model they are read-only with all bits 1 because they were decoded for discrete control registers that were not implemented.

RBUS ACCESS TIMING

All of the port registers are multiplexed between processor access and their internal function by the telephony system clock; since the call processor is asynchronous to this clock, the interface will add a randomly varying synchronizing delay to each access.

PORT NUMBER ASSIGNMENTS

In the preferred embodiment, the first 128 port numbers have been assigned to the alarm and auxiliary voice functions and the remaining 1920 ports serve the peripherals installed in the telephony shelves.

One hundred and ninety-two ports are assigned to each 24 card telephony shelf, as follows:

PORT NUMBER ASSIGNMENTS

| TSU/SSU Pair Nr | Port Number From–Thru | Devices Connected |
|---|---|---|
| 1 (0) | 0–63 | Tones & Alarms |
| | 64–127 | Conferences |
| | 128–319 | 1st Shelf |
| | 320–511 | 2nd Shelf |
| 2 (1) | 512–703 | 3rd Shelf |
| | 704–895 | 4th Shelf |
| | 896–1023 | 5th Shelf, 1–16 |
| 3 (2) | 1024–1087 | 5th Shelf, 17–24 |
| | 1088–1279 | 6th Shelf |
| | 1280–1471 | 7th Shelf |
| | 1472–1535 | 8th Shelf, 1–8 |
| 4 (3) | 1536–1663 | 8th Shelf, 9–24 |
| | 1664–1854 | 9th Shelf |
| | 1856–2047 | 10th Shelf |

TELEPHONY SYSTEM CONTROL

The system control provides default initial conditions for the telephony functions, diagnostic capabilities, and access to the system's configuration, status, and serial number. The initialization function is described only in regard to the FIFO, all other functions being known and not forming part of the invention.

INITIALIZATION REGISTER

The initialization functions are controlled by bits in byte $7FFF (byte #F for port 2047):

TABLE IV

```
Bit:   F E D   C   B A 9   8
$7FFF  — — DST  DGZ — — EFQ INI
       │   │        │   │
       │   │        │   └── Disable Slave Timing
       │   │        └────── Enable Diagnostics
       │   └─────────────── Enable FIFO Queue
       └─────────────────── Initialized
```

INITIALIZATION REGISTER (INIT)

This register is read-write but all bits will be reset to zero by the Power-Up Reset signal from the CSU.

ENABLE FIFO QUEUE

Bit #9 (EFQ) controls the event report FIFO queue described in regard to the Event Report FIFO.

The EFQ bit will be cleared to 0 by power-up reset and must be set to 1 after the Q-Size register has been initialized, for normal operation.

When this bit is reset to 0 the FIFO will be disabled, the Q-Size and Q-Wptr registers and the queue buffer may be written, the FIFO-not-empty interrupt will not occur, and the SSU scan registers will hold their reports.

When this bit is set to 1 the FIFO and its interrupt will function normally and the Q-Size and Q-Wptr registers and the queue buffer will be read-only.

This bit has no effect on the operation of the FIFO Data register except in the RAM Test diagnostic mode (see 2.2.2.4).

EVENT REPORT FIFO

This is a single hardware first in-first out queue that collects the reports that are generated by the signal scanner units on behalf of the peripherals connected to the ports; when a scan register detects an event its port number will be entered into this queue; when the FIFO Data register is read the entry read will be removed from the queue.

The FIFO is implemented as a circular buffer, using 256 words of RAM and two 8-bit counters, and will hold up to 255 entries.

An event that occurs when the queue is full or not enabled will not be discarded but will be held by the scan register (in its WF bit) until space in the queue is available, as described below; all service requests will appear in the queue eventually but they may be in random order if the FIFO is allowed to fill.

FIFO-NOT-EMPTY INTERRUPT

The TTU provides a signal called /QMPTY on the RBUS that is used by the CSU to generate a CBUS interrupt; this signal will be driven HI (to cause an interrupt) when the FIFO is enabled and not empty and will be driven LO otherwise.

Logically: /QMPTY: =(EFQ=1) AND (Q-SIZE<0)

or: QMPTY: =(EFQ=0) OR (Q-SIZE=0)

FIFO DATA REGISTER

The FIFO entries may be read from word $7FEC (bytes #C and D for port 2046):

TABLE V

```
Bit:    F E D C │ B A 9 8 │ 7 6 5 4 │ 3 2 1 0
$7FED         Port Number              Flags    $7FEC
       — A 9 8 7 6 5 4 3 2 1 0       — — W V
                Waited for FIFO ──────────┘
                Valid Report ──────────────┘
                       FIFO DATA
```

The twelve most significant bits of this register are the number of a port and the four least significant bits are qualifying flags. This register is read-only; data written will be lost.

Reading either the whole word or the odd-address byte will remove the entry read from the queue and advance the FIFO. When the FIFO becomes empty the entire word will be zero, which is the flags for empty and the port number for silence.

VALID REPORT

Bit #0 (V) is:
0 when the FIFO is empty and
1 when the port number and flags are valid.

Note that when the FIFO is empty the whole word will be zero.

WAITED FOR FIFO

Bit #1 is:
0 for reports in event sequence and
1 for reports that have been delayed.

This bit is a copy of the WF bit of the scan register that made the report, as it was when this entry was requested; the scan register will clear its WF bit when the report is accepted by the FIFO.

PORT NUMBER

Bits #E thru 4 of the FIFO data are the port number of a peripheral device requiring service when V=1 and are all zero when V=0.

[UNUSED]

Bits #2 and 3 are reserved for future use and are both 0 in the current model. Bit #F will also be 0 because there are at most 2047 ($7FF) ports in the system.

QUEUE SIZE REGISTER

The number of entries currently in the FIFO may be read from byte $7FEE (byte #E for port 2046):

TABLE VI

```
Bit:    7  6  5  4 │ 3 2 1 0
        Number of Entries        $7FEE
        128 64 32 16 8 4 2 1
```

Q-SIZE

This register must be cleared to zero before the FIFO is enabled; the power-up reset does not initialize the FIFO.

When the FIFO is disabled (EFQ=0) this register is read/write; the FIFO may be set empty by clearing this register, data previously read from the FIFO may be recovered by incrementing this register, and data may be discarded from the FIFO by decrementing this register.

When the FIFO is enabled (EFQ=1) this register is read-only and data written will be ignored.

QUEUE WRITE-POINTER REGISTER (Q-WPTR)

The cell number of the next free word in the FIFO buffer may be read from byte $7FEF (byte #F for port 2046).

TABLE VII

| Bit: | F E D C | B A 9 8 |
|---|---|---|
| $7FEF | | First Free Cell<br>128 64 32 16 8 4 2 1 |
| | Q-WPTR | |

This register has been provided for hardware diagnostic purposes and is read/write only when the FIFO is disabled; when the FIFO is enabled this register is read-only and data written will be ignored.

QUEUE BUFFER AREA

The 256 words of RAM that are used for the FIFO queue appear in the last four bytes (#C–F) of the next-to-last group of 128 ports (ports 1792=$700 thru 1919=$77F).

The correspondence between the Q-WPTR and Q-SIZE registers and the cell address is:

| RBUS address bit: | $E | D | C | B | A | 9 | 8 | 7 | 6 | 5 | 4 | 3 | 2 | 1 |
|---|---|---|---|---|---|---|---|---|---|---|---|---|---|---|
| TTU Select =: | 1 | ● | ● | ● | ● | ● | ● | ● | ● | ● | ● | 1 | 1 | ● |
| Q-Bufr Select =: | ● | 1 | 1 | 0 | ● | ● | ● | ● | ● | ● | ● | ● | ● | ● |
| Size Register bit: | ● | ● | ● | ● | 7 | 6 | 5 | 4 | 3 | 2 | 1 | ● | ● | 0 |
| Write-Pointer bit: | ● | ● | ● | ● | F | E | D | C | B | A | 9 | ● | ● | 8 |

FIFO BUFFER ADDRESSING

When the FIFO is enabled the RAM that is used for the queue is read-only and data written will be ignored; the FIFO should be disabled by setting EFQ=0 when a read/write RAM test diagnostic is to be performed.

IMPLEMENTATION

When a report is entered into the queue the port number and flags are written into the cell specified by [Q-WPTR] and then the pointer and size registers are both incremented; when the FIFO data register is read the data is obtained from the cell specified by [(Q-WPTR minus SIZE)modulo 256] and then only the size register is decremented.

When the FIFO is full or disabled (SIZE=255 {$FF} or EFQ=0) no entries are written to the buffer; when the FIFO is empty (SIZE=0) data is not read from the buffer; in both these cases the write pointer and size do not change.

All sixteen bits of FIFO data, including the V (always 1) and unused (always 0) bits, are always written to and read from the buffer cells except when the FIFO is empty.

CLOCK DISTRIBUTION

The output of the TTU crystal oscillator is 49,152 kiloHertz. This oscillator drives an ECL flip-flop divider whose outputs are directly connected to the system backplane to provide clean and precise 24,576 kiloHertz "tick" and 2.048 MHz. PCM bit rate clocks; all of the units of the Telephony Controller, including the TTU itself, derive all their timing from these signals.

The TTU master cycle counter provides TTL outputs to the backplane at the 8000 Hertz PCM sample rate and the 500 Hz. signaling multiplex rate for system synchronization and at 409,600 Hz. for the 10 ms. scan register timers.

TIME SWITCH UNIT

The Time Switch Unit (TSU) implements the TTIS, which is a simple pure time switch that gives full access and is non-blocking. The matrix may be configured for 512, 1024, 1536, or 2048 ports; in the maximum configuration it contains the equivalent of 4,194,304 crosspoints.

CONTROL OF THE SWITCH

The CPU controls the switch by writing port numbers into the Source Pointer registers. There is one source pointer value register for each port, as explained above, with regard to FIG. 2.

TABLE VIII

SOURCE POINTER VALUE REGISTER

| Bit: | F E D C | B A 9 8 | 7 6 5 4 | 3 2 1 0 | |
|---|---|---|---|---|---|
| Byte $B | | (spare) | | | Byte $A |
| $9 | Source: Port Number | | Pad Select | | $8 |

These registers are part of the port interface structure described above; bytes #$B and A are spare RAM.

SOURCE POINTER

Each source pointer is 12 bits long and shares a word with the Pad (attenuator) control. The contents of the source pointer register specify the port number of the source of the voice or data that will be received by the device at the port that owns the register. Bit #$F of the source pointer is ignored because the highest port number is 2047 ($7FF).

The source for any port may be any port, itself included, independently for each port. The destination for a port is specified only indirectly, by setting some port(s) to have it as source; each port may transmit to any number of ports or none.

Most voice connections will be conventional two-way conversations, in which the source for each party is the other party, but certain other configurations are also useful; for example, when a party is receiving dial tone or silence and sending to a Touch-Tone [T.M., AT&T] decoder we have a chain, and when many parties are listening to busy tone we have a broadcast. A configuration in which each port in some set listens to its predecessor in the set (the first port listens to the last) is a ring and might be used by a packet data network.

SWITCHABLE LOSS (PAD)

An attenuator is included in the voice path from the switch to each telephony device. The attenuator is selected from a set of sixteen independently for each port by the four bits of the Pad Select register adjacent to the source pointer.

A value of zero will select zero loss for voice and transparency for data; the other fifteen attenuators are available for the management of loss plans and tone levels. The attenuators do not affect the polarity bit of the PCM but only the seven magnitude bits and are not intended to be used for anything but PCM voice.

The attenuators in the prototype TSU are for mu-Law and have the following losses:

| | | | PAD VALUES | | | | |
|---|---|---|---|---|---|---|---|
| Pad | Loss | Pad | Loss | Pad | Loss | Pad | Loss |
| $0: | zero | $4: | 3.5 dB | $8: | 7.5 dB | $C: | ** |
| $1: | 2.0 dB | $5: | 4.0 dB | $9: | 9.0 dB | $D: | ** |
| $2: | 2.7 dB | $6: | 4.7 dB | $A: | −0.3 dB | $E: | ** |
| $3: | 3.0 dB | $7: | 6.0 dB | $B: | −3.0 dB | $F: | ** |

[** = not programmed, do not use]

Each attenuator is equivalent to a combination of ideal decoder, linear attenuator, and ideal encoder but is implemented by a table of output character as function of input character contained in a bipolar read-only memory, the PAD PROM. The tables in the pad prom can be programmed independently, for any value of attenuation (or gain, if necessary), and for either mu- or A-law PCM or for conversion between laws by the procedures described in appendix D.

IMPLEMENTATION

TCU is a simple timeslot interchanger: the PCM and data characters from all ports are multiplexed together, stored in the Source Store ($SS^0$–$SS^3$), retrieved from it according to the addresses kept in the Address Store ($A^0$–$A^3$), and sent through a demultiplexer back to the ports. Each port owns one cell in each memory; the Address Store is presented to the CPU as the array of source pointer registers but the Source Store can not be addressed by the CPU.

FOUR MODULE T-SWITCH

The present 2048 port switch was implemented as a set of four 512 port modules for convenience in the construction and so that the full expense of the large switch need not be borne by smaller systems.

The Source Store in a simple T-switch must both write and read 8000 characters per second for every port, so that the Source Store in a 2048 port switch must run 2*2048*8000 or 32,768,000 byte cycles per second. Rather than attempt to run a single RAM at this blinding speed, we chose to have four Source Stores operating in parallel, each serving 512 ports, and to make each Source Store 32 bits wide, so that four samples may be written to it at once. Each Source Store has its own Address Store; the pointer read from the Address Store addresses one of the 512 words in the Source Store and selects one sample from the four in the word by a multiplexer.

Both the Source Stores and Address Stores are built from 2149 RAM chips and 74LS374 pipeline registers and run 1024 cycles per frame with comfortable margin (at 8.192 MHz. with 122 nanosecond cycles). In each frame each Source Store has 512 four-sample write cycles and 512 one-sample read cycles and each Address Store has 512 address read cycles and 512 cycles dedicated to CPU access that are controlled by the processor interface and may be read or write but will be mostly do-nothing. Each of the four Address Stores has 1024 words of 16 bits; the whole RAM is available to the CPU interface but only 512 words are used to address the Source Store. Each address word has one spare bit, 11 bits of source pointer, and 4 bits of pad control that are passed to the PAD-ROM with the sample from the Source Store.

This switch has four times as many RAM chips as might be found in a switch organized in some other way but the cost of the RAM is not large and is well offset by the simplicity, direct control, and modularity of this organization.

X BUS PCM BUS

The X Bus, as shown in FIG. 3, is further explained below. The PCM is passed between the switch modules on a 32 bit wide bus that operates a 4.096 MHz, the rate of the Source Stores write cycles. This bus is connected to all the cards in the Telephony Controller except the telephony timing unit and is split into four bytes; in order that the four TSU may be identical, the four bytes are not wired straight across but are swapped around between the pairs.

Each line in the chart below represents one byte (eight wires); the open numbers are the TSU/SSU pair that drives the wires and the numbers in parentheses are the bank for the Source Store in which the bytes are stored.

TABLE IX

| | PCM INTERNAL BUS WIRING | | | |
|---|---|---|---|---|
| Pair: 0 | | 1 | 2 | 3 |
| 0 (0) | — — X | 1 (0) | 2 (0) X | 3 (0) |
| 1 (1) | — — | 0 (1) | —X— X X | 3 (1) | 2 (1) |
| 3 (3) | — — X | 2 (3) | —X— | 1 (3) X | 0 (3) |
| 2 (2) | — — | 3 (2) | — — | 0 (2) | 1 (2) |

The control of the Selector at the output of the Source Store is modified by two exclusive-or gates to correct for the crosswiring:

TABLE X

BYTE SELECT LOGIC FUNCTION

| Source Pointer MS Bits (Pair) | CDAD-1,2 (Pair) | | | |
|---|---|---|---|---|
| | 00 (0) | 01 (1) | 10 (2) | 11 (3) |
| 00 (0) | 00 (0) | 01 (1) | 10 (2) | 11 (3) |
| 01 (1) | 01 (1) | 00 (0) | 11 (3) | 10 (2) |
| 10 (2) | 10 (2) | 11 (3) | 00 (0) | 01 (1) |
| 11 (3) | 11 (3) | 10 (2) | 01 (1) | 00 (0) |

Bank Select Bits (Byte)

SIGNAL SCANNER UNIT

The Signal Scanner Unit (SSU) provides the identification, status, control, and serial signaling functions for all peripheral devices connected to the ports and a mechanism that will collect rotary dial pulses or detect service requests from the peripherals.

SIGNALING REGISTERS

The SSU Store appears to the call processing system (CPU) as eight bytes of the Port Interface Structure described above.

All of the SSU registers are maintained in the TCU and in a store that is immediately accessible by the CPU and separate and dedicated for each port.

TABLE XI
SIGNALING REGISTER STRUCTURE

| Byte | Bit: FEDC BA98 | 7654 3210 | Byte |
|---|---|---|---|
| 7 | Scan Register Store Location | | 6 |
| 5 | Extend | Type | 4 |
| 3 | Control | OUT | 2 |
| 1 | IN | Status * | 0 |
| | | Service Request Bit ──┘ | |

PERIPHERAL UNITS

Bytes #$0 thru 5 (Status, IN, OUT, Control, Type, and Extend) represent registers of the peripheral devices; except for the service request bit, the SSU does not interpret, modify, or otherwise process any of this data.

SERVICE REQUEST BIT

Bit #0 of byte #$0 from each telephony device, the LSB of Status, is called Service Request (SRQ); the SRQ bit, and only this bit, is monitored by the scanner function described below.

The port peripherals is arranged so that this bit will change whenever any significant change of the peripheral's state occurs and such that 0 means idle, on-hook, out-of-service, or discontent and 1 means active, off-hook, in-service, or happy.

TYPE BYTE

Byte #$4 (Type) has been reserved for device identification and must be supplied by every telephony peripheral; the pattern of the bits in this byte are expected to be unique to each kind of peripheral.

The value of Type will normally be constant for a given unit but may include bits that indicate optional configurations where appropriate.

The all zero ($00) and all one ($FF) values of Type are reserved by convention for empty slots and shorted buses, respectively.

OTHER REGISTERS

The meaning of all the other bits in these bytes may be determined by the particular device that is installed at the corresponding port and is given in the specification document for the port peripheral.

Analog telephony peripherals are permitted to omit any definition of the IN, OUT, and Extend bytes; any unit that does not specify otherwise will ignore the OUT and Extend bytes and reproduce the Type information in the IN byte.

UNUSED PORTS

A full set of signaling registers is provided for every device address, including those assigned to the conference and tone unit which has no signaling functions.

For all ports for which no device is connected to the signaling, it may be assumed that Status, IN, and Type are all zero; that Control, OUT, and Extend have no effect; and that the scan functions work as described but can generate only timeout and spurious edge reports because SRQ will always be 0.

In TTIS, the signaling for device addresses #0-31 (tones) are used by the system alarm functions (Power and Alarm Board) and the signaling for device addresses #32-63 (tones) and 64-127 (conference) are not connected to anything.

SCANNING

All of the parts of the entire TTIS signaling system operate continuously at 500 cycles per second; every function is performed once for each port in each two millisecond cycle (except IN and OUT, which are done twice per cycle).

The signaling cycle is also called a "superframe" and coincides with a set of sixteen consecutive PCM frames. The various functions for the several ports may be performed at different times in the cycle, with scheduling of such functions not forming part of the corrective concept and is not described herein.

CONTROL, OUT, AND EXTEND

Bytes #$2, 3, and 5 are read from the RAM by the SSU and sent to the port peripherals in every superframe. The SSU does not ever write into these bytes but the CPU may read from them; the data read will be the data last written by the CPU.

STATUS, IN, AND TYPE

Bytes #$0, 1 and 4 are received from the port peripherals and written to the RAM by the SSU in every superframe. The CPU may write into these bytes but the SSU does not ever read from them and will rewrite all bytes in every two millisecond cycle.

SERIAL SIGNALING

The OUT byte is read and sent twice and the IN byte is received and written twice by the SSU in each two-millisecond cycle. The OUT byte may be written and the IN byte may be read by the Common Control Services Unit.

THE SCAN REGISTER

Bytes #$6 and 7 control and monitor various functions that process the SRQ bit received from the peripheral and are called the Scan Register. As explained in the foregoing, the Scan Register controls a state machine and responsive to the port, stores a value indicative of port status.

The scan register is both read and written by the SSU and is intended to be both written and read by the CPU. The normal use of this register will be that:
1. the CPU writes a particular 16-bit pattern to the scan register, to initialize and enable a certain function;
2. the SSU performs the function;
3. the SSU signals completion of the function by entering its port number in the TTU FIFO queue (see chapter 2);
4. and the CPU reads the results from the scan register.

Data written to the status byte by the CPU does not affect the scan register functions in any way.

READ/WRITE OPERATION

The logic that implements the functions of the scan register is shared among modules of 512 devices by multiplexing; the previous state is read from the RAM, the appropriate next state is determined by the state machine logic, the port address is written to the FIFO if required, the next state is written back into the RAM, and this process is repeated for all ports once in each signaling cycle.

The SSU takes 2.7 microseconds to read, update, report, and rewrite each scan register; this process cannot by interrupted by the CPU and will appear to be completely indivisible and very nearly instantaneous. The probability of catching a scan register in the middle of its update is only 1 in 819.2 (0.0012).

If the CPU happens to write to the scan register during its processing (after the read and before the rewrite) the calculated next state will not overwrite the data written by the CPU; the CPU's data will effectively overwrite the update. Normal use will be to write the whole word with a single access but a write to either byte will suppress the rewrite of both bytes when it occurs during an update.

SCAN CONTROL BITS

The five most-significant bits of the scan register control all of the scanner functions.

TABLE VII
SCAN CONTROL BITS

| Bit: | F | E | D | C | B | |
|---|---|---|---|---|---|---|
| $7 | EN | WF | F1 | F0 | SS | ... |

Enable Scan —
FIF0 Flag —
Mode Select —
Steady State —

ENABLE SCAN

Bit #$F (EN) may be reset to 0 to disable the scan register functions and must be set to 1 to enable the scanner to make reports to the FIFO; when the scanner detects the selected condition it will enter the address of the port in the FIFO and will reset EN to 0, to prevent further reports.

FIFO FLAG

Bit #$E (WF) is used internally for management of the FIFO and should be reset to 0 when any function is initialized; WF will be set to 1 by the SSU when a report is to be made to the FIFO and the FIFO is either full or not enabled.

When WR=1 the SSU will attempt to report to the FIFO on every cycle; on the first cycle that finds the FIFO both enabled and not full, the SSU will report the port address to the FIFO with the delayed report indicator set (FIFO bit W=1) and will reset WF to 0. The operation of WF is not affected by an other bit in the scan register.

MODE SELECT

Bits #$D and C (F1 and F0) select the mode of operation, and the configuration and meaning of bits #$A through 0, of the scan register.

Four modes can be selected but only three of them have any use, on the preferred embodiment.

STEADY STATE

Bit #$B (SS) is the debounced version of SRQ; this bit has the same polarity and meaning as that given by the installed peripheral to bit #0 of its Status.

Changes in the peripheral's status are delayed and may even be ignored by the debouncing mechanism, whose operation depends on the mode selected.

MODE 00—EDGE DETECTOR

When F1,F0=00 the scan register controls a variable debouncer that will report the occurrence of a change in SRQ when enabled.

The edge detector can report either an "edge" or a "pulse", that is, either the first change of SRQ or the corresponding second, complementary change.

In this mode the meaning of bits #$A through 0 is:

TABLE XIII

| Bit: | A 9 | 8 | 7 | 6 | 5 | 4 | 3 | 2 | 1 | 0 | |
|---|---|---|---|---|---|---|---|---|---|---|---|
| ... | I4 I3 | I2 | I1 | I0 | L4 | L3 | L2 | L1 | L0 | EP | $6 |
| | 16 8 | 4 | 2 | 1 | 16 | 8 | 4 | 2 | 1 | E D G E | |
| | samples INTEGRATOR | | | | samples LIMIT | | | | | | |

SCAN REGISTER -- EDGE DETECTOR MODE

INTEGRATOR

Bits #$A thru 6 (I4-I0) are a 5-bit binary up/down counter that filters SRQ; the result of the debouncing is recorded in SS. Integrator counts down when SRQ=0 and up when SRQ=1, will be updated every 2 ms, will run as long as mode 00 is selected, and is independent of EN.

The range of Integrator is controlled by Limit: the minimum count is zero and the maximum count is equal to the value set in Limit (which may also be zero). if SRQ=0 and Integrator is 0, then SS will be reset to 0 and Integrator will remain 0. Symmetrically, if SRQ=1 and Integrator equals Limit then SS will be set to 1 and Integrator will remain equal to Limit.

When Integrator is set greater than Limit, it will count up and down until it either overflows from 31 to 0 or counts down to equal Limit, and will then resume normal operation.

When Limit is set to 5, Integrator will operate as described under mode 01 below but the bits are in different positions in the register.

LIMIT

Bits #5 thru 1 (L4-L0) are a static 5-bit register that sets the speed of Integrator by controlling the range of its count; the number of consecutive samples that will be counted *before* SS changes is equal to the binary-weighted value of Limit. Limit is not modified by the SSU.

All values in the range of 0 to 31, inclusive, are valid; the delay from a bounce-free change of SRQ to the change of SS may be set to any value between 0 and 31 samples (0 to 62 ms), in one sample (2 ms) increments. If Limit is set to zero than SS will equal SRQ and changes will be recognized with only the 0-2 ms random delay inherent in the scanning.

EDGE

Bit #0 (E/P) selects reporting at the first (E/P=1) or second (E/P=0) change of SS.

When SS is changed by Integrator, either 1→0 or 0→1, then if EN=E/P=1 the port address will be reported to the FIFO and EN will be reset to 0 or if E/P=0 then E/P will be set to 1.

INITIALIZATION

When F1=0 and F0=0 is selected: SS should be set equal to SRQ and Integrator should be set to zero if SS=0 or equal to Limit if SS=1; otherwise a spurious or premature edge will be detected.

If mode 00 has been running with an appropriate limit then it may be re-enabled by setting EN to 1, optionally clearing E/P to 0, and disturbing no other bits.

Examples:
1. Fast four-millisecond debounce, off-hook and waiting for on-hook edge:

| Bit | F | E | D | C | B | A | 9 | 8 | 7 | 6 | 5 | 4 | 3 | 2 | 1 | 0 | |
|---|---|---|---|---|---|---|---|---|---|---|---|---|---|---|---|---|---|
| Value | 1 | 0 | 0 | 0 | 1 | 0 | 0 | 0 | 0 | 1 | 0 | 0 | 0 | 0 | 1 | 1 | $894B |

2. Ring-trip thirty-millisecond debounce, on-hook and waiting for off-hook edge:

| Bit | F | E | D | C | B | A | 9 | 8 | 7 | 6 | 5 | 4 | 3 | 2 | 1 | 0 | |
|---|---|---|---|---|---|---|---|---|---|---|---|---|---|---|---|---|---|
| Value | 1 | 0 | 0 | 0 | 0 | 0 | 0 | 0 | 0 | 0 | 0 | 0 | 1 | 1 | 1 | 1 | $801F |

MODE 01—DIAL PULSE COLLECTOR

When F1,F0=01 the scan register will collect dial pulse from a standard rotary telephone or equivalent device. The dial pulse collector will report a completed digit, when a hookflash or hang-up is detected, or on digit overrun, and will optionally report the beginning of dialing.

In this mode the meaning of bits #$A through 0 is:

TABLE XIV

| Bit: | A | 9 | 8 | 7 | 6 | 5 | 4 | 3 | 2 | 1 | 0 | |
|---|---|---|---|---|---|---|---|---|---|---|---|---|
| | I2 | I1 | I0 | T3 | T2 | T1 | T0 | D3 | D2 | D1 | D0 | $6 |
| | 4 | 2 | 1 | 80 | 40 | 20 | 10 | 8 | 4 | 2 | 1 | |
| | samples | | | milliseconds | | | | pulse count | | | | |
| | INTEGRATOR | | | TIMER | | | | DIGIT | | | | |

SCAN REGISTER -- DIAL PULSE COLLECTOR MODE

Note that bit #4 (*) has two independent functions.

INTEGRATOR

Bits #$A thru 8 (I2-I0) are a 3-bit binary up/down counter that debounces SRQ; the result of the integration is recorded in SS and is used to control the digit and timeout counters.

Integrator counts down when SRQ=0 and up when SRQ=1, follows a six-state sequence with a minimum count of 0 and a maximum count of 5, and runs continuously as long as mode 01 is selected, independent of EN.

When Integrator is set to 6 or 7 it will continue to count up and down until it either overflows from 7 to 0 or counts down to 5 and will then resume normal operation. Except for the fixed limit and the different position of the bits, Integrator operates as described for mode 00.

Since SRQ is sampled at 500 Hz and SS may change on the sixth count, a noise-free change will be recognized with a delay of 10 to 12 milliseconds. A change of noisy input will be recognized with a greater delay, depending on the amount of noise: each "false" sample must be corrected by a "true" sample and will therefore add 4 ms to the recognition delay.

TIMER

Bits #7 thru 4 (T3-T0) are a 4-bit binary timer that terminates digit collection when no pulses are received within a preset interval.

Timer will be reset to zero whenever SS is changed by Integrator and will then count 100 Hz for the duration of the following break or make interval, except when EN=0 or Digit=0; Timer will recognize an interdigit pause or a hookflash when it counts up to 15 (all ones, $F), which will take 150±6 millisecond, and then the device address will be reported to the FIFO, EN will be reset to 0, and if SS=0 (on-hook, break) then Timer will be cleared to 0 by any change of SS, even when EN=0, so that the occurrence of a pulse after digit collection has terminated—an error condition—may be determined from the contents of Timer.

also Digit will be cleared to zero to indicate hookflash or hang-up.

The pulses counted by Timer are not synchronized to SRQ or SS so there is some ambiguity in its timing; an interval less than 144 ms will be counted as a dial pulse, an interval longer than 156 ms will be recognized as an interdigit pause or a hookflash, and an interval between 144 and 156 ms may be interpreted either way.

Timer does not count when EN=0 nor when Digit=0; when EN=0 the digit collector has finished its function and may be waiting for service; when Digit=0 the digit collector is waiting for the first pulse, for which no timeout is provided, and the 1's bit of Timer (T0) has a different function.

DIAL TONE TRIP

Bit #4 (T0) enables generation of an extra report to the FIFO at the beginning of dialing; this report indicates that dial tone may be removed, is for information only, and does not terminate digit collection. T0 means "dial tone trip" only when EN=1 and Digit=0 and will be reset to 0 along with T1 thru T3 whenever an edge is detected.

If Integrator changes SS when T0=1, EN=1, and Digit=0, then the address of the port will be entered into the FIFO and Timer (T0 thru T3) will be reset to 0 but EN will remain set to 1 and digit collection will continue. If the digit collector is initialized in the on-hook state the extra report will be generated when the peripheral goes off-hook but Timer will not begin to count until Digit is incremented, at the next on-hook edge.

DIGIT

Bits #3 thru 0 (D3-D0) are a 4-bit binary counter that counts the dial pulses; when EN=1, Digit will be incremented when Integrator changes SS from 1 to 0, i.e., at the leading edge of every break pulse.

Digit must be initialized to zero, will not be incremented when EN=0, and will bed reset by the SSU only when Timer recognizes hook-flash or hang-up.

Digit will count at most 15 pulses; if a sixteenth pulse is detected Digit will remain equal 15, the device address will be reported to the FIFO, EN will be reset to 0 to terminate digit collection, and Timer will be zero to indicate overrun.

INITIALIZATION

When F1=0 and F0=1 is selected: SS should be set equal to SRQ; Integrator should be set to 0 if SS=0 or to 5 if SS=1; Timer should be set to 1 if the dial-tone trip report is desired and reset to 0 otherwise; and Digit must be reset to 0.

The standard initialization for the digit collector is:

| Bit   | F | E | D | C | B | A | 9 | 8 | 7 | 6 | 5 | 4 | 3 | 2 | 1 | 0 |
|-------|---|---|---|---|---|---|---|---|---|---|---|---|---|---|---|---|
| Value | 1 | 0 | 0 | 1 | 1 | 1 | 0 | 1 | 0 | 0 | 0 | * | 0 | 0 | 0 | 0 |

When * is the leading-edge report is desired ($9D10), and 0 otherwise ($9D00).

INTERPRETATION

The loop state at termination may be determined from the contents of Digit—Bits #3-0:
* Digit=0: On-hook timeout—hookflash or hand-up,
* Digit>0: Off-hook timeout—digit valid.

The digit collector does not distinguish between hookflash and hangup; the hook discriminator has been provided for that purpose.

The occurrence of an extra pulse after the dialed digit may be determined from the contents of Timer—Bits #7-4:
* Timer=15: Normal—no extra pulses,
* Timer=0: Overrun—edge after timeout or sixteenth pulse, Timer will be either 0 or 15 ($F) at termination; other values occur only during operation or when written by the CPU.

MODE 10—HOOK DISCRIMINATOR

When F1,F0=10 the scan register controls a simple timer that will report after a preset interval or when an edge is detected, whichever occurs first.

In this mode the meaning of bits #$A through 0 is:

TABLE XV

| Bit: | A | 9 | 8 | 7 | 6 | 5 | 4 | 3 | 2 | 1 | 0 |
|------|---|---|---|---|---|---|---|---|---|---|---|
|      | I2 | I1 | I0 | T7 | T6 | T5 | T4 | T3 | T2 | T1 | T0 | $6 |
|      | 4 | 2 | 1 | 1280 | 640 | 320 | 160 | 80 | 40 | 20 | 10 |
|      | samples | | | milliseconds | | | | | | | |
|      | INTEGRATOR | | | TIMER | | | | | | | |

SCAN REGISTER -- HOOK DISCRIMINATOR MODE

INTEGRATOR

Bits #$A thru 8 (I2-I0) are a 3-bit binary up/down counter that debounces SRQ and records the result in SS; Intergator operates ad described in section 4.2.5.1 for mode 01, and runs continuously as long as mode 10 is selected, independent of EN.

If Integrator changes SS (either 1→0 or 0→1) when EN=1 then the device address will be reported to the FIFO and EN will be reset to 0.

TIMER

Bits #7 thru 0 (T7-T0) are a 8-bit counter that will count 100 Hz when EN=1. When Timer overflows from $FF to $00 the device address will be reported to the FIFO and EN will be reset to 0.

If Timer is preset to 255 ($FF) a report will occur within 10 ms; if Timer is preset to 1 the timeout report will not occur before 2.540 to 2.550 seconds. Timer should not be initially zero, as this would give an ambiguous result if an edge were detected immediately.

Timer is not reset by the SSU and will not count at the same time that SS changes or when EN=0.

INITIALIZATION

When F1=1 and F0=0 is selected: SS should be set equal to SRQ; Integrator should be set to 0 it SS=0 or to 5 if SS=1; and Timer should be set to the two's complement of the integer nearest the product of 100 Hertz and the desired time limit.

Example:
Hookflash/hangup discrimination—telephone off-hook, timer set to 750 milliseconds:

| Bit   | F | E | D | C | B | A | 9 | 8 | 7 | 6 | 5 | 4 | 3 | 2 | 1 | 0 |       |
|-------|---|---|---|---|---|---|---|---|---|---|---|---|---|---|---|---|-------|
| Value | 1 | 0 | 1 | 0 | 0 | 0 | 0 | 0 | 1 | 0 | 1 | 1 | 0 | 1 | 0 | 1 | $AOB5 |

(decimal 75=0100 1011 binary, $4B
decimal −75=1011 0101 binary, $B5)

INTERPRETATION

Except when Timer is initially zero and an edge is detected immediately, the cause of termination may be determined from the contents of Timer—Bits #7-0:
* Timer=0: Time out—no change of SRQ,
* Timer>0: SRQ change—no timeout.

The elapsed time may be obtained by subtracting the initial value of Timer from its final value and the time remaining may be obtained as the two's complement of Timer's final value.

MODE 11—SPARE

When F1,F0=11 the scan register has no useful function; this mode has been reserved for future requirements.

In the present implementation: if EN=1 the device address will be reported to the FIFO and EN will be reset to 0, Integrator operates as in modes 01 and 10, and bits #7 through 0 have no meaning but may be read and written as RAM.

In this mode the meaning of bits #$A through 0 is:

TABLE XVI

| Bit: | A | 9 | 8 | 7 | 6 | 5 | 4 | 3 | 2 | 1 | 0 | |
|---|---|---|---|---|---|---|---|---|---|---|---|---|
| | | 12 | 11 | 10 | | | | | | | | $6 |
| | | 4 | 2 | 1 | | | (Spare) | | | | | |
| | | samples | | | | | | | | | | |
| | | INTEGRATOR | | | | | | | | | | |

SCAN REGISTER -- SPARE MODE

The inventive principle disclosed herein may be practiced with any suitable data systems, currently available or available in the future. The data system concepts described herein for implementing these inventive principles should not be viewed as limiting such inventive principles. Further, details of the system implementation have been omitted as they will be well known to those skilled in the art.

What I claim is:

1. A method for detecting and reporting the occurrence of a random event in peripheral units connected by respective ports addressed through a time division multiplex scanning schedule, comprising the steps of:
   (a) generating a clock signal;
   (b) responsive to said clock signal, connecting said ports and signaling information generated at said ports, according to said scanning schedule, to a central store;
   (c) storing said signaling information, generated at said ports according to said scanning schedule, at said central store;
   (d) responsive to said signaling information being indicative of a random event at any one of said ports, storing the identification of the respective port producing said event, in said central store;
   (e) establishing an order of priority in said central store for responding to said ports;
   (f) receiving an instruction code for a respective port and, step (d) includes the step;
   (g) responsive to said instruction code, responding to the said random event signal.

2. The method of claim 1, wherein said step (f) includes the step:
   (h) providing a respective instruction code, for each respective port and responsive to said scanning schedule, connecting a logic means to said instruction code to control the operation of the logic means responsive to said signaling information.

3. The method of claim 2, wherein the step (h) includes the step:
   (i) providing respective register means for said ports to store the said instruction codes for said respective ports.

4. The method of claim 2, wherein said step (e) includes the step:
   (j) determining the next state of the respective port in response to the said signaling information for a said respective port and the step (k) of
   (k) providing a modified instruction code to said register means indicative of said next state.

5. The step of claim 4, wherein said step (j) includes the step:
   (l) storing a modified instruction code indicative of the mode of said port responsive to said signaling information.

6. The method of claim 1 wherein said step (c) includes step (c1) selecting signaling information indicative of the status of a peripheral unit, and
   (c2) storing said selected signaling information in said central store to represent an image of said peripheral status.

7. The method of claim 6 wherein said step (c1) includes the step
   (c3) selecting said signaling information indicative of a service request from a said peripheral and identifying the type of a said peripheral.

8. The method of claim 6 wherein said step (g) includes the step
   (g1) storing said response in said central store to represent an image of said responses received by a said peripheral unit.

9. A method for randomly connecting peripheral units, connected by respective ports to a system, by time division multiplexing comprising the steps of:
   (a) providing a timing clock for synchronization;
   (b) responsive to said timing clock, defining a schedule of scanning cycles for repetitively scanning said peripheral units for respective data or signaling information;
   (c) responsive to data or signaling information received during said scanning cycles, identifying source and address peripheral units for transmitting and receiving data respectively;
   (d) responsive to the identification of step (c), connecting said data from said identified source peripheral units to said identified address peripheral units, respectively;
and wherein said step (d) of connecting including the steps;
   (e) arranging a respective location in a source store for storing said source peripheral unit data to be accessible by said respective address peripheral unit;
   (f) receiving said scanned source data at said source store and storing said source data in said respective arranged location;
   (g) responsive to said scanning schedule, accessing said source data in said respective arranged location;
   (h) providing said source data to said respective address peripheral unit;
and wherein said step (d) further includes the steps of;
   (i) designating a plurality of address store locations for respective address peripheral units;
   (j) writing into respective ones of said address locations a pointer value corresponding to a said arranged locations; and
   (k) storing said source data into said arranged location.

10. The method of claim 9, wherein said step (d) includes the step
   (l) responsive to said scanning schedule, accessing said source data in said arranged location corresponding to said pointer value for transmission to said address peripheral unit designated for said respective address location.

11. The method of claim 10, wherein said step (d) includes the step
   (m) responsive to said scanning schedule cycles, repeating steps (f) to (h).

12. The method of claim 10, including the step
   (n) dividing said peripheral units into address modules wherein said address modules have a number of peripheral units less than the total number of said system peripheral units;

(o) providing source store locations for substantially all said peripheral units for access by the respective peripheral units in said address module.

13. The method of claim 12, whereas said step (n), includes the step:

(p) dividing said peripheral units into address modules;

(q) dividing said source store into source modules, each said source module having a number of peripheral units less than the total number of said system peripheral units;

(r) providing source store locations for substantially all source modules for separate ones of said address modules.

14. The method of claim 12, including the step (s) implementing step (l) concurrently for separate address modules.

15. The method of claim 13, including the step (t) implementing step (l) concurrently for separate address modules.

16. The method of claim 9 wherein said step (b) includes the step (b1) selecting signaling information indicative of the status of a peripheral unit, (b2) storing said selected signaling information in a central store to represent an image of said peripheral unit status.

17. The method of claim 16 wherein said step (b1) includes the step (b3) selecting said signaling information indicative of a service request from a said peripheral or identifying the type of said peripheral unit.

18. The method of claim 17 including the step (b4) responsive to said selected signaling information being indicative of a random event at a said peripheral unit, responding to said signaling information and storing said response in said central store to represent an image of said response received by a said peripheral unit.

19. An apparatus for detecting and reporting the occurrence of a random event in peripheral units connected by respective ports addressed through a time division multiplex scanning schedule, comprising;

(a) means for generating a clock signal;

(b) means responsive to said clock signal, for connecting said ports and signaling information generated at said ports, according to said scanning schedule, to a central store;

(c) means for storing said signaling information, generated at said ports according to said scanning schedule, at said central store;

(d) means responsive to said signaling information being indicative of a random event at any one of said ports, for storing the identification of the respective port producing said event, in said central store;

(e) means for establishing an order of priority in said central store for responding to said ports;

(f) means for receiving an instruction code for a respective port and, wherein means (d) includes;

(g) means responsive to said instruction code for responding to the said random event signal.

20. (h) The apparatus of claim 19, wherein said means (f) includes, means providing a respective instruction code, for each respective port and responsive to said scanning schedule, connecting a logic means to said instruction code to control the operation of the logic means responsive to said signaling information.

21. (i) The apparatus of claim 20, wherein means (h) includes providing respective register means for said ports for storing means the said instruction codes for said respective ports.

22. The apparatus of claim 20, wherein means (i) includes:

(j) means for determining the next state of the respective port in response to the said signaling information for a said respective port, and (k) means for providing a modified instruction code to said register means indicative of said next state.

23. The apparatus of claim 22, wherein said means (j) includes:

(l) means for storing a modified instruction code indicative of the mode of said port responsive to said signaling information.

24. The apparatus of claim 19, wherein said means (c) includes:

(c1) means for selecting signaling information indicative of the status of a peripheral unit, and (c2) means for storing said selected signaling information in said central store to represent an image of said peripheral status.

25. The apparatus of claim 24 wherein said means (g) includes:

(g1) means for selecting said signaling information indicative of a service request from a said peripheral and identifying the type of a said peripheral.

26. The apparatus of claim 24 wherein said means (g) includes:

(g2) means for storing said response in said central store to represent an image of said responses received by a said peripheral unit.

27. An apparatus for randomly connecting peripheral units, connected by respective ports to a system, by time division multiplexing comprising:

(a) means providing a timing clock for synchronization;

(b) means responsive to said timing clock, defining a schedule of scanning cycles for repetitively scanning said peripheral units for respective data or signaling information;

(c) means responsive to data or signaling information received during said scanning cycles, for identifying source and address peripheral units for transmitting and receiving data respectively;

(d) means responsive to the identification means (c) for connecting said data from said identified source peripheral units to said identified address peripheral units respectively;

and wherein said means (d) includes, (e) means for arranging a respective location in a source store for storing said source peripheral unit data to be accessible by said respective address peripheral unit;

(f) means for receiving said scanned source data at said source store and storing said source data in said respective arranged location;

(g) means responsive to said scanning schedule, accessing said source data in said respective arranged location;

(h) means for providing said source data to said respective address peripheral unit;

(i) means for designating a plurality of address store locations for respective address peripheral units;

(j) means for writing into respective ones of said address locations a pointer value corresponding to said arranged locations; and (k) means for storing said source data into said arranged location.

28. The apparatus of claim 27 including:

(l) means responsive to said scanning schedule, for accessing said source data in said arranged location corresponding to said pointer value for transmission to said address peripheral unit designated for said respective address location.

29. The apparatus of claim 28 including:

(m) means for dividing said peripheral units into address modules wherein said address modules have a number of peripheral units less than the total number of said system peripheral units;

(n) means for providing source store locations for substantially all said peripheral units for access by the respective peripheral units in said address module.

30. The apparatus of claim 29 wherein said means (m) includes:

(o) means for dividing said peripheral units into address modules;

(p) means for dividing said source store into source modules, each said source module having a number of peripheral units less than the total number of said system peripheral units;

(q) means for providing source store locations for substantially all source modules for separate ones of said address modules.

31. The apparatus of claim 29 including:

(r) means for enabling said means (l) concurrently for separate address modules.

32. The apparatus of claim 30 including:

(s) means for enabling said means (l) concurrently for separate address modules.

33. The apparatus of claim 27 wherein said means (b) includes:

(b1) means for selecting signaling information indicative of the status of a peripheral unit, (b2) means for storing said selected signaling information in a central store to represent an image of said peripheral unit status.

34. The apparatus of claim 33 wherein said means (b1) includes:

(b3) means for selecting said signaling information indicative of a service request from a said peripheral or identifying the type of said peripheral unit.

35. The apparatus of claim 34 including:

(b4) means responsive to said selected signaling information being indicative of a random event at a said peripheral unit, responding to said signaling information and storing said response in said central store to represent an image of said response received by a said peripheral unit.

* * * * *